US007047213B2

(12) United States Patent
Haynes et al.

(10) Patent No.: US 7,047,213 B2
(45) Date of Patent: May 16, 2006

(54) METHOD FOR PURGING ABANDONED SHOPPING CARTS FROM AN ELECTRONIC COMMERCE WEB SITE

(75) Inventors: Dennis Frank Haynes, Marietta, GA (US); Ravesh Lala, Roswell, GA (US); Matthew Bunkley Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 828 days.

(21) Appl. No.: 09/971,880

(22) Filed: Oct. 3, 2001

(65) Prior Publication Data

US 2003/0065577 A1    Apr. 3, 2003

(51) Int. Cl.
*G06F 17/60*  (2006.01)

(52) U.S. Cl. .................. 705/26; 718/104; 717/104; 717/108; 717/116; 709/228; 707/100

(58) Field of Classification Search ............. 705/26
See application file for complete search history.

(56) References Cited

U.S. PATENT DOCUMENTS

| | | | | |
|---|---|---|---|---|
| 4,775,932 A | 10/1988 | Oxley et al. | .................. | 364/200 |
| 4,797,810 A | 1/1989 | McEntee et al. | ............. | 364/200 |
| 4,967,353 A | 10/1990 | Brenner et al. | .............. | 364/200 |
| 5,136,706 A | 8/1992 | Courts | ........................ | 395/600 |
| 5,218,698 A | 6/1993 | Mandl | ......................... | 345/650 |
| 5,560,003 A | 9/1996 | Nilsen et al. | ............... | 395/600 |
| 5,577,246 A | 11/1996 | Priddy et al. | ............... | 395/618 |
| 5,687,368 A | 11/1997 | Nilsen | ......................... | 395/614 |
| 5,745,681 A | 4/1998 | Levine et al. | ............. | 395/200.3 |
| 5,765,174 A | 6/1998 | Bishop | ....................... | 707/206 |
| 6,029,141 A | 2/2000 | Bezos et al. | ................... | 705/27 |
| 6,125,434 A | 9/2000 | Willard et al. | ............... | 711/170 |
| 6,175,864 B1 | 1/2001 | Addison et al. | ............. | 709/219 |
| 6,199,099 B1 | 3/2001 | Gershman et al. | ........... | 709/203 |
| 6,212,556 B1 | 4/2001 | Arunachalam | .............. | 709/219 |
| 6,237,009 B1 | 5/2001 | Waldo et al. | ................ | 707/206 |
| 6,247,026 B1 | 6/2001 | Waldo et al. | ................ | 707/206 |
| 6,263,350 B1 | 7/2001 | Wollrath et al. | ............ | 707/206 |
| 6,876,977 B1 * | 4/2005 | Marks | ........................... | 705/26 |
| 2001/0010046 A1 | 7/2001 | Muyres et al. | ................ | 705/52 |

OTHER PUBLICATIONS

Tobias Ratschiller, Mar. 15, 2000, Session Handling with PHP 4, downloaded from the Internet on Jun. 26, 2005, 12 pages.*

(Continued)

*Primary Examiner*—Wynn Coggins
*Assistant Examiner*—Jaime E. Zurita
(74) *Attorney, Agent, or Firm*—Schmeiser, Olsen & Watts; David R. Irvin

(57) ABSTRACT

An improved method for purging abandoned shopping carts from an electronic commerce web server. Periodically, the number of shopping carts that belong to guest shoppers is determined and compared with a threshold. When the number shopping carts that belong to guest shoppers exceeds the threshold, a guest shopper garbage collection routine applies to the shopping carts that belong to guest shoppers, and an established shopper garbage collection routine applies to carts that belong to established shoppers. In one embodiment of the invention, the guest shopper garbage collection routine purges shopping carts that have been inactive for a first period of time, whereas the established shopper garbage collection routine purges shopping carts that have been inactive for a second period of time that is longer than the first.

13 Claims, 4 Drawing Sheets

OTHER PUBLICATIONS

Bulletin of the Technical Committee in Data Engineering, IEEE Computer Society, Mar. 2000, vol. 23, No. 1, 57 pages, downloaded from the Internet on Dec. 20, 2005.*

Lim, Tian F. et al. "A Memory-Efficient Real-Time Non-Copying Garbage Collector". Proceedings of the International Symposium on Memory Management, 1998, pp. 118-129.

Appel, Andrew W. et al. "Real-Time Concurrent Collection on Stock Multiprocessors" SIGPLAN '88 Conference on Programming Language Design and Implementation, 1988 pp. 11-20.

Siebert, Fridtjof "Real-Time Garbage Collection in Multi-Threaded Systems on a Single Processor", Real Time Systems Symposium, 1999. Proceedings, pp. 277-278.

Research Disclosure "Heuristic Garbage Collection", No. 444174 pp. 666-667.

Doddapaneni, S. et al. "Method for Efficient and Scalable Interaction in a Client-Server System in Presence of Bursty Client Requests", IBM Patent Application, U.S. Appl. No. 09/181,386, Filed Oct. 28, 1998.

* cited by examiner

METHOD FOR PURGING ABANDONED SHOPPING CARTS FROM AN ELECTRONIC COMMERCE WEB SITE

FIELD OF THE INVENTION

The present invention applies to electronic commerce, and more particularly to a method for purging abandoned shopping carts from an electronic commerce web site in order to improve the performance of the web site's server.

BACKGROUND

The convenience of on-line electronic shopping has led to its widespread acceptance. To shop on-line, a shopper visits an Internet web site provided by a merchant, browses the goods or services on offer, opens and loads an electronic shopping cart, and places an order. However, a significant number of shoppers, by some estimates more than half, abandon their shopping carts and leave the web site without placing orders.

Abandoned shopping carts are not easily detected. Some shoppers fill their carts slowly; consequently, some carts that appear to be abandoned are instead active, and a hasty decision might mistakenly tag these slowly filled but active carts as abandoned. Nevertheless, abandoned shopping carts should be purged as quickly as possible, as they reduce the capacity and responsiveness of the server that supports the electronic commerce web site. Not only do abandoned shopping carts generally occupy the server's database space and waste processor cycles, they also fill the server's shopping tables and thereby put the server at risk of data overflow.

To reduce this risk, a web server typically executes a garbage collection routine periodically, to purge abandoned shopping carts. Because some shopping carts may be active but slow to fill, the garbage collection routine allows a cart to be inactive for a long time before purging the cart. The purpose of this long window of time is to minimize the likelihood of losing a sale or of inconveniencing a customer. So, in many applications, an abandoned cart may be allowed to persist for three months before it is purged by the garbage collection routine.

For on-line shopping services where demand is highly variable, for example services that sell paraphernalia related to sports events, such a long window of time effectively defeats the purpose of the garbage collection routine. For example, during an Olympic Games there may be a sharp peak in demand for items related to a first event. Shopping carts abandoned during this peak may be quite troublesome, as they occupy database resources that may be needed to service another demand peak that accompanies a second event of the Games. On the one hand, in such situations a long garbage collection window may render the garbage collection routing ineffective, particularly when the second event soon follows the first event. On the other hand, a significant number of shoppers may purposefully allow a shopping cart to persist over the entire course of the Games, accumulating items from day to day, and place an order at a convenient time after the Games. To purge these seemingly abandoned carts would be a mistake that could have significant consequences in terms of lost sales and alienated shoppers.

Thus there is a need for an improved way of purging abandoned shopping carts from electronic commerce web servers, so that the carts may be purged at the earliest possible moment that is consistent with sufficiently minimizing the risk of mistakenly purging shopping carts that are active but slow to fill, and thereby losing sales and inconveniencing shoppers.

SUMMARY

The present invention provides an improved method for purging abandoned shopping carts from an electronic commerce web server. A shopping cart is classified according to whether it belongs to a shopper who is an established shopper, i.e., a shopper who has a prior relationship of record with the merchant operating the web site and is therefore known to the merchant, or belongs to a guest shopper, i.e., a shopper who does not have a prior relationship of record with the merchant operating the web site.

Periodically, the number of guest shoppers with shopping carts is determined and compared with a guest shopper threshold. When the number of guest shoppers with shopping carts exceeds the guest shopper threshold, a guest shopper garbage collection routine applies to the shopping carts that belong to the guest shoppers, and an established shopper garbage collection routine applies to other shopping carts that belong to the established shoppers. In one embodiment of the invention, the guest shopper garbage collection routine purges shopping carts that have been inactive for more than a first period of time, for example fifteen minutes, whereas the established shopper garbage collection routine purges shopping carts that have been inactive for more than a second period of time, for example three months.

Thus, shopping carts that belong to established shoppers, who may be those shoppers most likely to place an order rather than abandon a shopping cart, are subject to a different garbage collection routine than guest shoppers. As a result, shopping carts abandoned by guest shoppers are quickly purged from the web server, and the performance of the web server thereby improved, without risking the alienation of established shoppers or loss of sales. These and other aspects of the invention will be more fully appreciated when considered in light of the following detailed description and drawings.

DETAILED DESCRIPTION

The present invention provides a way of improving the performance of an electronic commerce web server by quickly purging shopping carts that are abandoned by guest shoppers, without risking the alienation of, or loss of sales to, established shoppers. Shopping carts that belong to established shoppers, who may be those shoppers most likely to place an order rather than abandon a shopping cart, are subject to a different garbage collection routine than shopping carts that belong to guest shoppers.

Figure 1:
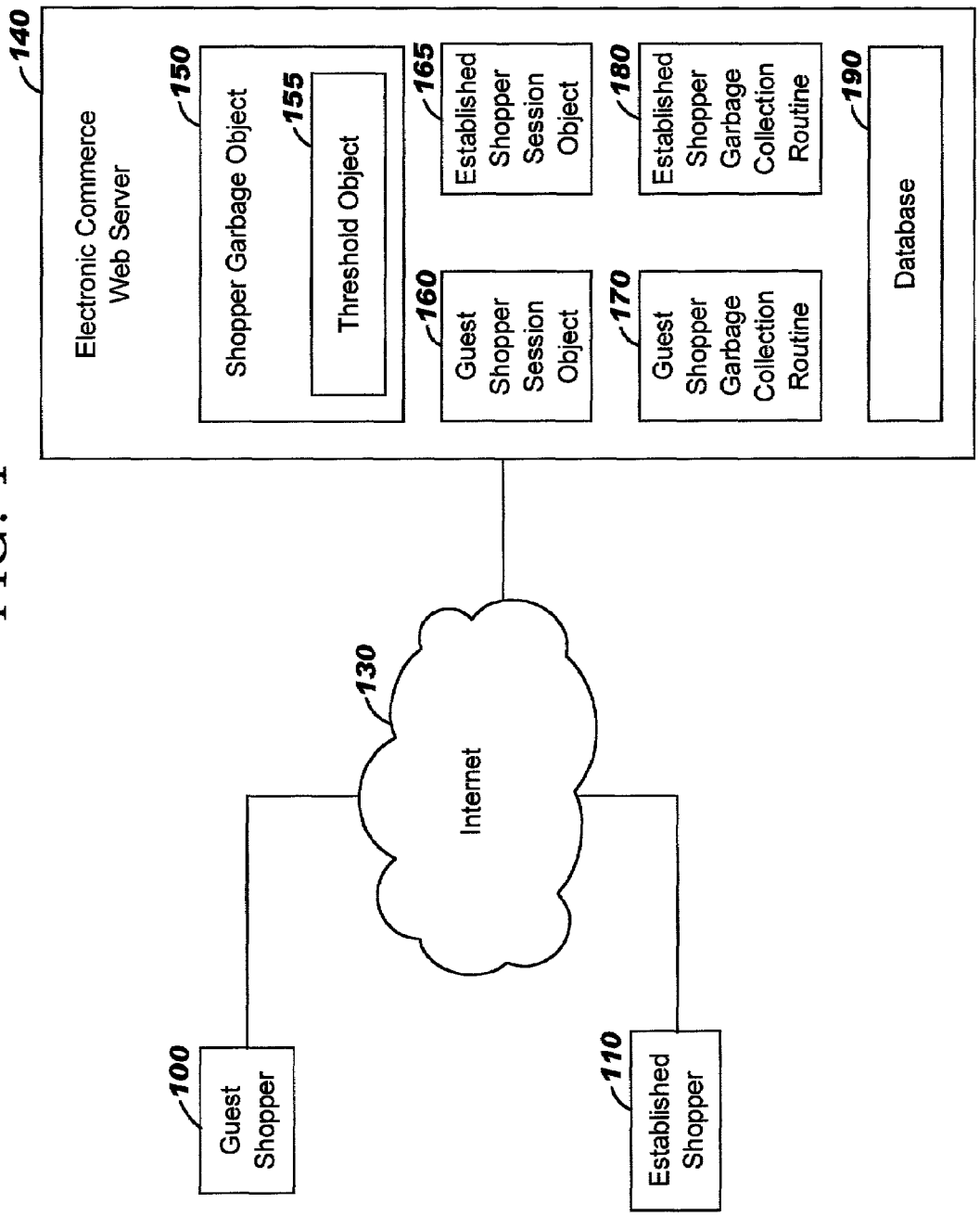
FIG. 1 is a block diagram showing structural aspects of an exemplary embodiment of the present invention in the context of an electronic commerce web server.

FIG. 1 is a block diagram showing structural aspects of an exemplary embodiment of the present invention applied in the context of an electronic commerce web server. In FIG. 1, a guest shopper 100 and an established shopper 110 are connected by the Internet 130 or other communication network to an electronic commerce web server 140. Here, the term "established shopper" indicates a shopper who has established a relationship of record or an account with the server 140, for example by registering a shipping address or a credit card number, or who has an established history of on-line shopping or engaging in other electronic commerce activities supported by the server 140. Conversely, the term "guest shopper" indicates a shopper who is not an established shopper.

The server 140 includes a shopper garbage object 150, a threshold object 155, a guest shopper session object 160 associated with the guest shopper 100, an established shopper session object 165 associated with the established shopper 110, a guest shopper garbage collection routine 170, an established shopper garbage collection routine 180, and a database 190. The threshold object 155 may be part of the shopper garbage object 150, or the two may be separate; they are discussed here as though they were separate for descriptive convenience. When the server 140 is brought up, the shopper garbage object 150 is created, and the threshold object 155 registers with the shopper garbage object 155.

The threshold object 155 includes a guest shopper threshold, which is a numerical value that is determined and loaded by a system administrator, and a clock for providing an expiration time. The clock may be derived from a current-time clock, or derived from server-clock time, and so forth, and the expiration time may be current time or server-clock time, modified by an offset. For example, the expiration time may be one hour earlier than current time, in which case the expiration time would be 14:00 hours universal when the current time is 15:00 hours universal.

When the guest shopper 100 accesses the server 140 through the Internet 130, the guest shopper session object 160 is created and registered with the shopper garbage object 150 (and the threshold object 155 if the two are separate), and information regarding the guest shopper session is written to the database 190. This information may include identification information, billing information, shopping cart information, and so forth. Likewise, when the established shopper 110 accesses the server 140, the established shopper session object 165 is created and registered with the shopper garbage object 150, and information regarding the established shopper session is written to the database 190.

When the guest shopper 100 opens a shopping cart, or alters the contents of a shopping cart by adding, changing, or removing an item, the time of the event updates the last transaction property of the guest shopper session object 160. A shopping cart opened by a guest shopper is said to "belong to" that guest shopper. Likewise, when the established shopper 110 opens a shopping cart, or alters the contents of a shopping cart by adding, changing, or removing an item, the time of the event updates the last transaction property of the established shopper session object 165. A shopping cart opened by an established shopper is said to "belong to" that established shopper. A time recorded in a last transaction property of a session object is called here a "transaction time."

The guest shopper garbage collection routine 170 and the established shopper garbage collection routine 180, which might also be called algorithms, are responsible for purging shopping carts abandoned by the guest shopper 100 and the established shopper 110, respectively. To remove garbage in this context means to purge a shopping cart from the server 140. A shopping cart may be purged by destroying its session object and associated tables in the database 190. The guest shopper garbage collection routine 170 may collect garbage more frequently than the established shopper garbage collection routine 180. This means that the established shopper garbage collection routine 180 may allow a seemingly inactive shopping cart to persist for a longer time than allowed by the guest shopper garbage collection routine 170 before purging the shopping cart.

For convenience, FIG. 1 shows only one guest shopper, one established shopper, one guest shopper session object, and one established shopper session object; nevertheless, the present invention applies as well to other numbers of each of these elements as well as one, including zero or the absence of an element. Each guest shopper among a plurality of guest shoppers may be assigned its own guest shopper session object among a plurality of guest shopper session objects, and likewise in kind for established shoppers and established shopper session objects. Further, the structure of FIG. 1 is illustrative rather than limiting, and those skilled in the art may devise other suitable structures once taught the invention. For example, the elements of FIG. 1 may be combined, or one element may be subsumed by another.

Figure 2:
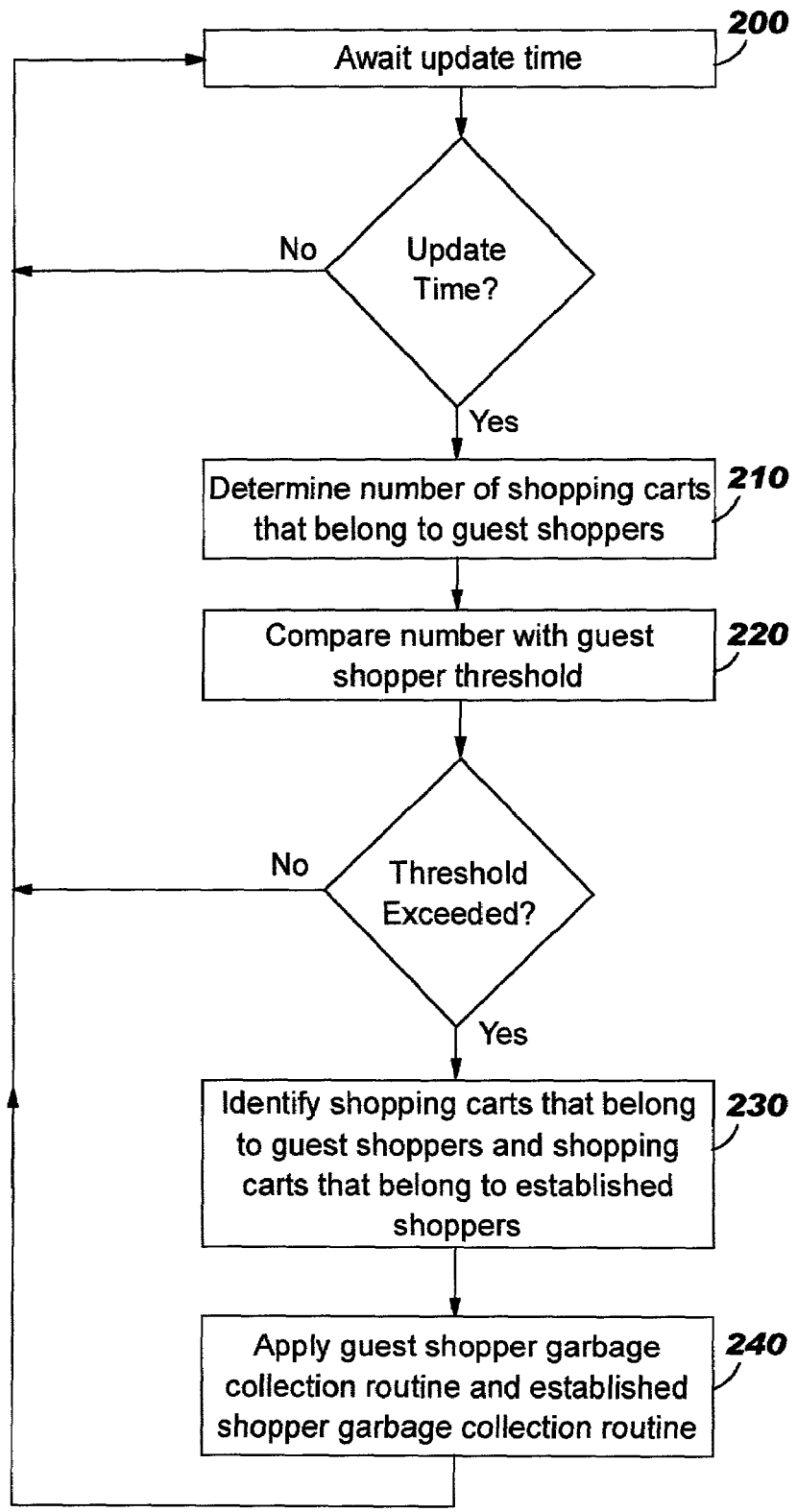
FIG. 2 is a flowchart showing aspects of the operation of another exemplary embodiment of the invention in the context of FIG. 1.

In FIG. 2, the server 140 awaits an update time, which may occur, for example, every fifteen minutes (step 200). When an update time occurs, the server 140 determines the number of shopping carts that belong to guest shoppers such as the guest shopper 100 of FIG. 1 (step 210 of FIG. 2). The number of shopping carts that belong to guest shoppers is then compared with the guest shopper threshold (step 220). If the number of shopping carts that belong to guest shoppers does not exceed the guest shopper threshold, the server 140 returns to await the arrival of the next update time (step 200).

Otherwise (i.e., the number of shopping carts that belong to guest shoppers exceeds the guest shopper threshold), the server 140 identifies shopping carts that belong to guest shoppers and shopping carts that belong to established shoppers (step 230), and applies the guest shopper garbage collection routine 170 to the shopping carts that belong to guest shoppers and applies the established shopper garbage collection routine 180 to shopping carts that belong to established shoppers (step 240). For example, the guest shopper garbage collection routine 170 may purge all shopping carts that belong to guest shoppers that have been inactive for a given period of time, or purge the N carts belonging to guest shoppers longest inactive, or purge guest carts that are the most heavily loaded or the most lightly loaded in terms of purchase price or item count, and so forth. The server 140 then returns to await the next update time (step 200).

Figure 3:
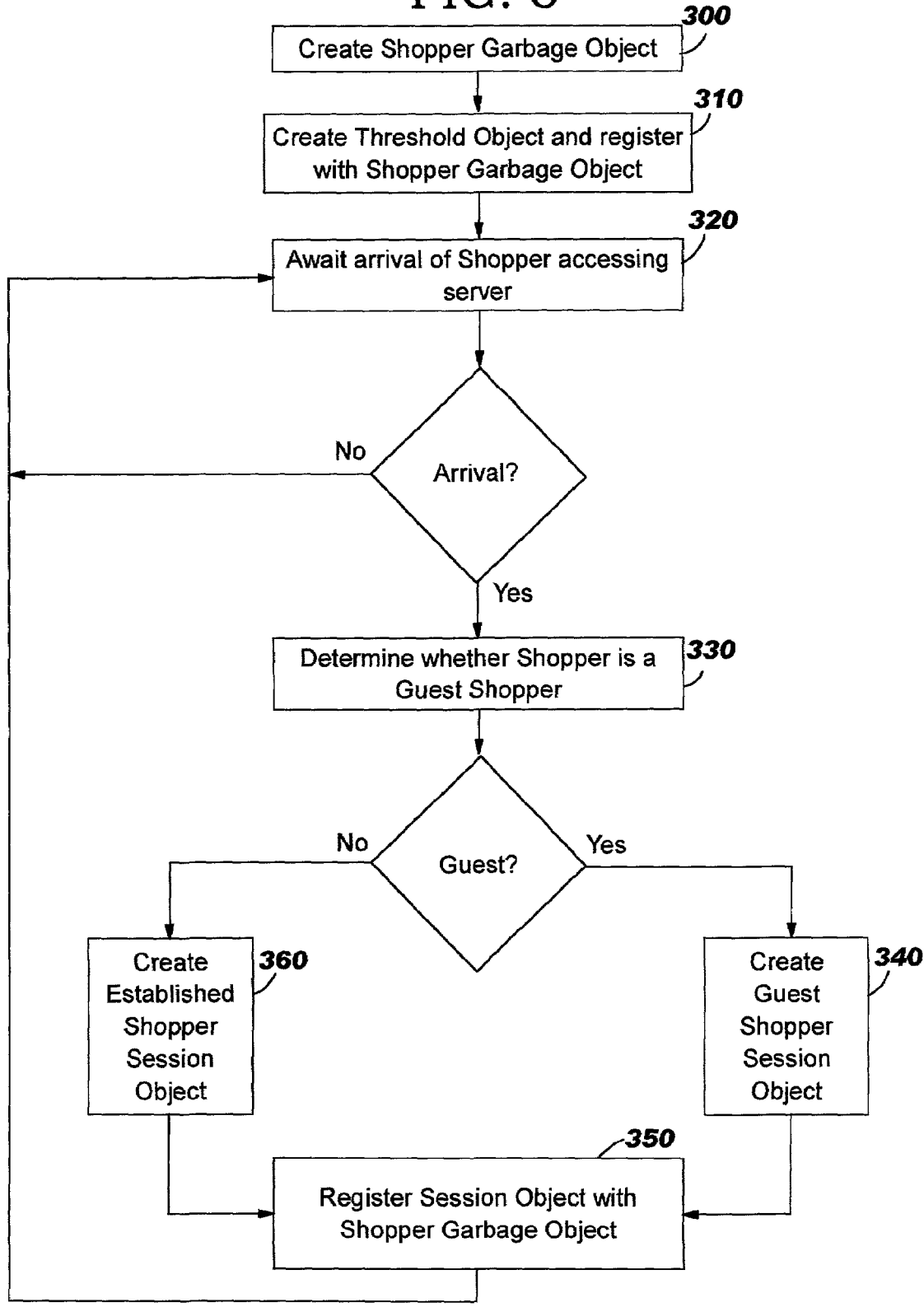
FIG. 3 is a flowchart showing aspects of the operation of yet another exemplary embodiment of the invention wherein objects shown in FIG. 1 are created.

In FIG. 3, the shopper garbage object 150 is created (step 300), and the threshold object 155 is created and registered with the shopper garbage object 150 (step 310). As mentioned earlier, in some embodiment of the invention the shopper garbage object 150 and the threshold object 155 may be separate, and in other embodiments, combined. The server 140 then awaits the arrival of a shopper accessing the server 140 (step 320).

When a shopper access the server 140, the server 140 determines whether the shopper is a guest shopper, for example by consulting records held in the database 190 (step 330). If the shopper is a guest shopper, a guest shopper session object is created, for example the guest shopper session object 160 of FIG. 1 (step 340). The guest shopper session object is then registered with the shopper garbage object 150 (step 350), and the process returns to await (step 300). Otherwise (i.e., the shopper is an established shopper), an established shopper session object is created, for example the established shopper session object 165 of FIG. 1 (step 360). The established shopper session object is registered with the shopper garbage object 150 (step 350), and the process returns to await (step 300).

Figure 4:
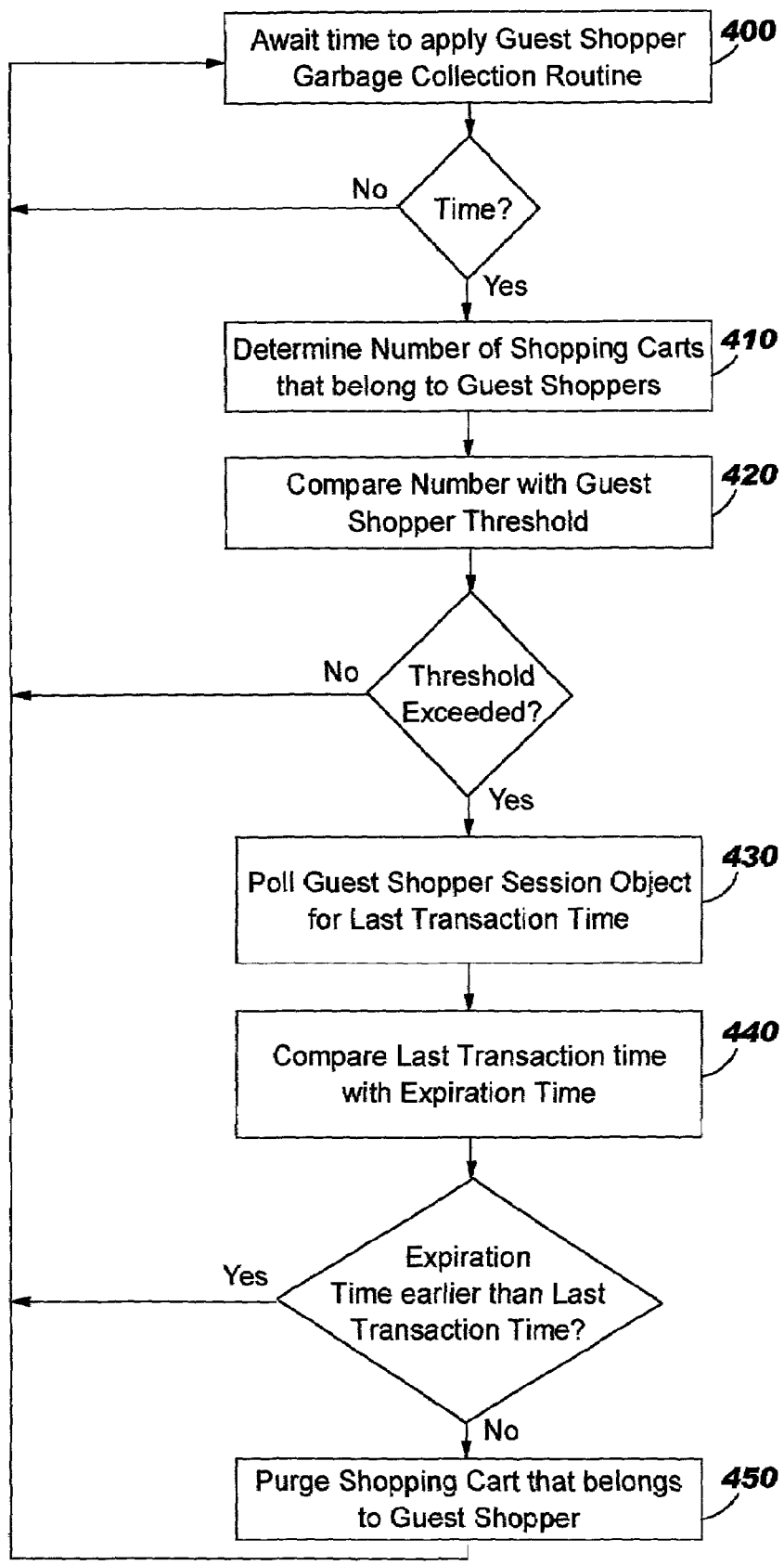
FIG. 4 is a flowchart showing aspects of the operation of still another exemplary embodiment of the invention.

In FIG. 4, the server 140 awaits a time to determine whether the guest shopper garbage collection routine 170 should be applied (step 400). When it is time, the number of shopping carts that belong to guest shoppers is determined (step 410). For example, the shopper garbage object 150 may poll the threshold object 155 to determine the number of shopping carts that belong to guest shoppers; the threshold object 155 returns the number to the shopper garbage object 150. The number of shopping carts that belong to guest shoppers is then compared with the guest shopper threshold (step 420). When the guest shopper threshold is not exceeded, the process returns to await the next determination (step 400).

Otherwise (the number of shopping carts that belong to guest shoppers exceeds the guest shopper threshold), the shopper garbage object 150 polls the guest shopper session object 160 to determine its last transaction time (step 430). The shopper garbage object 150 compares the last transaction time returned by the guest shopper session object 160 with the expiration time (step 440). When the expiration time is earlier than the last transaction time (i.e., the last transaction has occurred after the expiration time, and therefore the guest session object 160 has not expired), the process returns to await (step 400).

Otherwise (i.e., the expiration time is later than the last transaction time, and the guest session object 160 has therefore expired), the guest shopper garbage collection routine 170 purges the shopping cart that belongs to the guest shopper 100 (step 450). The process then returns to await (step 400).

For sake of clarity, the foregoing description of the operation depicted in FIG. 4 supposes that only one guest shopper session object is present. The invention applies as well, of course, when more than one guest shopper object is present, in which case steps 430 through 450 are repeated for each guest shopper session object.

From the foregoing description, those skilled in the art will appreciate that the present invention provides a way of improving the performance of an electronic commerce web server by quickly purging shopping carts that are abandoned by guest shoppers, without risking the alienation of established shoppers or loss of sales. The foregoing description is illustrative rather than limiting, however, and the present invention is limited only by the following claims.

We claim:

1. A method for purging shopping carts from an electronic commerce web site operated by a merchant, said electronic commerce web site comprising a web server, said method comprising the steps of:

identifying, upon occurrence of a next update time, guest shopping carts and established shopping carts existing at the electronic commerce web site, the guest shopping carts being shopping carts that belong to guest shoppers of the electronic commerce web site, the established shopping carts being shopping carts that belong to established shoppers of the electronic commerce web site, a guest shopper being defined as a shopper who does not have any prior relationship of record with the merchant, an established shopper being defined as a shopper who has a prior relationship of record with the merchant;

determining the total number (L) of guest shopping carts existing at the electronic commerce web site;

ascertaining whether L exceeds a specified guest shopper threshold number (M) of guest shopping carts existing at the electronic commerce web site, wherein if said ascertaining ascertains that L does not exceed M then again performing the identifying, determining steps, and ascertaining steps, and wherein if said ascertaining ascertains that L exceeds M then the method further comprises the steps of:

purging a subset of the guest shopping carts from the electronic commerce web site according to a first algorithm that is specific to the guest shopping carts, said first algorithm being comprised by the web server;

purging a subset of the established shopping carts from the electronic commerce web site according to a second algorithm that is specific to the established shopping carts, said second algorithm being comprised by the web server, said second algorithm differing from the first algorithm; and again performing the identifying, determining steps, and ascertaining steps, after performing the steps of purging the subset of the guest shopping carts and purging the subset of the established shopping carts.

2. The method of claim 1, wherein the next update time in the identifying step occurs periodically at discrete times.

3. The method of claim 1, wherein the prior relationship between the merchant and a first established shopper of said established shoppers comprises an account of the first established shopper on the web server.

4. The method of claim 1, wherein the prior relationship between the merchant and a first established shopper of said established shoppers comprises a registration of a credit card number of the first established shopper on the web server.

5. The method of claim 1, wherein the prior relationship between the merchant and a first established shopper of said established shoppers comprises a registration of a shipping address of the first established shopper on the web server.

6. The method of claim 1, wherein the web server comprises a first guest shopper session object for a first guest shopping cart of said guest shopping carts, wherein the first guest shopper session object was created when the first guest shopping cart came into existence when a first guest shopper associated with the first guest shopping cart initially accessed the web server via a communication network, wherein purging the first guest shopping cart due to L exceeding M comprises destroying the first guest shopper session object; and wherein the web server comprises a first established shopper session object for a first established shopping cart of said established shopping carts, wherein the first established shopper session object was created when the first established shopping cart came into existence when a first established shopper associated with the first established shopping cart initially accessed the web server via the communication network, wherein purging the first established shopping cart due to L exceeding M comprises destroying the first established shopper session object.

7. The method of claim 1, wherein the method further comprises specifying the guest threshold shopper number, and wherein said specifying is performed by a system administrator prior to said ascertaining.

8. The method of claim 1, wherein said purge the subset of the guest shopping carts and purging the subset of the established shopping carts results in a higher frequency of guest shopping carts being purged than of established shopping carts being purged.

9. The method of claim 1, wherein said purging the subset of the guest shopping carts according to the first algorithm comprises purging all guest shopping carts that have been inactive for a given period of time, and wherein a guest shopping cart is inactive for the given period of time if there is no addition, deletion, or change of an item in the guest shopping cart during the given period of time.

10. The method of claim 1, wherein said purging the subset of the guest shopping carts according to the first algorithm comprises purging a specified number of the guest shopping carts that have been longest inactive, and wherein a guest shopping cart is inactive when there is no addition, deletion, or change of an item in the guest shopping cart.

11. The method of claim 1, wherein said purging the subset of the guest shopping carts according to the first algorithm comprises purging a specified number of the guest shopping carts that are most heavily loaded in terms of purchase price.

12. The method of claim 1, wherein said purging the subset of the guest shopping carts according to the first algorithm comprises purging a specified number of the guest shopping carts that are most heavily loaded in terms of item count.

13. The method of claim 1, wherein the method further comprises:

detecting a new shopper accessing the web server;

determining whether the new shopper is a guest shopper; and if said determining whether the new shopper is a guest shopper determines that the new shopper is a guest shopper then creating a guest shopper session object with respect to the new shopper, otherwise creating an established shopper session object with respect to the new shopper.

* * * * *